United States Patent
Larsen

Patent Number: 5,434,497
Date of Patent: Jul. 18, 1995

[54] VERNIER ENHANCED CONTROL FOR SHUNT CONNECTED THYRISTOR-CONTROLLED CAPACITORS

[75] Inventor: Einar V. Larsen, Charlton, N.Y.

[73] Assignee: General Electric Company, Schenectady, N.Y.

[21] Appl. No.: 70,256

[22] Filed: Jun. 2, 1993

[51] Int. Cl.$^6$ .............................. G05F 1/652
[52] U.S. Cl. ..................... 323/209; 323/212; 323/220; 323/233
[58] Field of Search ............. 323/205, 208, 209, 210, 323/211, 212, 220, 233

[56] References Cited

U.S. PATENT DOCUMENTS

| | | | |
|---|---|---|---|
| 4,348,631 | 9/1982 | Gyngyi et al. | 323/211 |
| 4,638,238 | 1/1987 | Gyngyi et al. | 323/211 |
| 4,719,402 | 1/1988 | Boennen et al. | 323/211 |
| 5,032,738 | 7/1991 | Vithayathil | 307/112 |
| 5,202,583 | 4/1993 | Larsen et al. | 323/211 X |

OTHER PUBLICATIONS

"Case Studies Of Conventional And Novel Methods Of Reactive Power Control On An AC Transmission System", Vithayathil et al, Aug. 28, 1968.

Primary Examiner—Todd DeBoer
Assistant Examiner—Y. Jessica Han
Attorney, Agent, or Firm—Nixon & Vanderhye

[57] ABSTRACT

A firing controlled scheme including a method and apparatus for vernier operation of a shunt-connected thyristor-controlled capacitor (STCC) uses phase controlled firing of the thyristors based on monitored line voltage, monitored thyristor current, and a thyristor current command to vary the effective reactance of the capacitor. The STCC includes a capacitor and surge inductor connected in shunt across a power transmission line via a thyristor switch. A vernier controller predicts an upcoming firing angle based on the above parameters and switches the thyristor circuit to partially conduct pulses of thyristor current at different amplitude levels depending upon the commanded firing angle. By varying the firing angle, variable inductive and capacitive reactive power can be selectively delivered to the transmission line.

16 Claims, 6 Drawing Sheets

TIME (ELECTRICAL DEGREES)

*Fig. 5(b)*

TIME (ELECTRICAL DEGREES)

*Fig. 5(c)*

TIME (ELECTRICAL DEGREES)

VERNIER ENHANCED CONTROL FOR SHUNT CONNECTED THYRISTOR-CONTROLLED CAPACITORS

BACKGROUND AND SUMMARY OF THE INVENTION

The present invention relates to shunt-connected thyristor-controlled capacitors (STCC) where a capacitor is connected in shunt across a substantially inductive transmission line using thyristor type switches, and more particularly, to vernier type control of the STCC to vary the effective reactance of the capacitor.

Reactive compensators such as static VAR compensators (SVC) are used to control voltage and provide reactive power in AC power transmission systems and have many practical applications in those systems. They are used to maintain voltage at or near a constant level under slowly varying conditions in response to load changes, to correct voltage changes caused by unexpected events (e.g. load rejections, generator and line outages), and to reduce voltage flicker caused by rapidly fluctuating loads. They also are used to improve power system stability and power factor as well as current phase imbalance. Controlled switching of reactive elements regulates the amount of capacitive/inductive loading applied to the AC transmission line thereby modifying the reactive power delivered by the power generation system.

Volumes have been written regarding the control of thyristor switched capacitors (TSC). Until recently, this work has focused solely on determining when to turn the thyristor valve either fully on or fully off. Thus, only two reactances are provided. Exemplary works in this area include *Static Compensators For Reactive Power Control*, Canadian Electrical Association, edited by R. M. Mathur, Cantex Publications, Winipeg, 1984, and "Static VAR Compensators," edited by I. A. Erinmez, CIGRE Report by WG 38-01TF2, Paris, France.

Recently, it was suggested by J. J. Vithayathil and others in a 1988 paper entitled "Case Studies Of Conventional And Novel Methods Of Reactive Power Control On An AC Transmission System" and in U.S. Pat. No. 5,032,738 that by using partial conduction of an inductor across a series capacitor, the effective reactive compensation of the series capacitor could be varied. However, the inductor is controlled in the same way that a thyristor-controlled reactor (TCR) of a static VAR compensator is controlled, i.e. based on timing signals derived from zero crossing times of the capacitor voltage.

Even more recently, there has been an effort towards designing a thyristor-controlled capacitor for series reactive power compensation that permits partial conduction (sometimes referred to as "vernier" control) of the thyristor valve to achieve an effective admittance other than those values associated with fully on or fully blocked thyristor valve operation. See for example U.S. Pat. No. 5,202,538 issued Apr. 13, 1993 the disclosure of which is incorporated herein by reference. Related U.S. patent application Ser. No. 08/048,133 filed on Apr. 13, 1993 and entitled "Transient Damping Thyristor Controlled Series Capacitor System" describes firing control logic for a series thyristor-controlled capacitor for increased capacitive reactance and certain firing to damp transients in the inductive region, the disclosure of which is incorporated herein by reference.

Thus, while partial-conduction control has been implemented for a thyristor-controlled reactor in parallel with series capacitors, such control of a shunt-connected capacitor has not been considered possible.

Accordingly, the present invention provides a basic firing control scheme, including a method and apparatus, for vernier operation of a shunt-connected thyristor-controlled capacitor (STCC) using phase controlled firing of the thyristor valve based on measured source voltage, measured thyristor current, and a desired predetermined thyristor current. The STCC includes a capacitor and surge inductor connected in shunt across the AC transmission line via a bidirectional (antiparallel) pair of thyristors, i.e. the thyristor valve. Vernier control is achieved by predicting an upcoming firing angle that switches the thyristors so as to partially conduct current through the capacitor and thyristors. In other words, by selectively varying the firing advance angle to angles other than those corresponding to fully conducting and fully blocked STCC operation, the thyristors provide a varying admittance. Thus, in response to a command from a higher level controller to change the reactive power, e.g. the thyristor current, from its present value to a new desired value, the present invention determines a new firing angle to partially conduct current through the thyristors and provide the desired amount of inductive or capacitive reactance.

BRIEF DESCRIPTION OF THE DRAWINGS

These and other objects, features and advantages of the present invention will become apparent to those skilled in the art from the following description and drawings in which.

DETAILED DESCRIPTION OF THE DRAWINGS

In the following description, for purposes of explanation and not limitation, specific details are set forth, such as particular circuits, circuit components, techniques, etc. in order to provide a thorough understanding of the present invention. However, those skilled in the art will recognize that the present invention may be practiced in other embodiments that depart from these specific details. In other instances, detailed descriptions of well known methods, devices, and circuits are omitted so as not to obscure the description of the present invention with unnecessary detail.

Figures 1A, 1B:
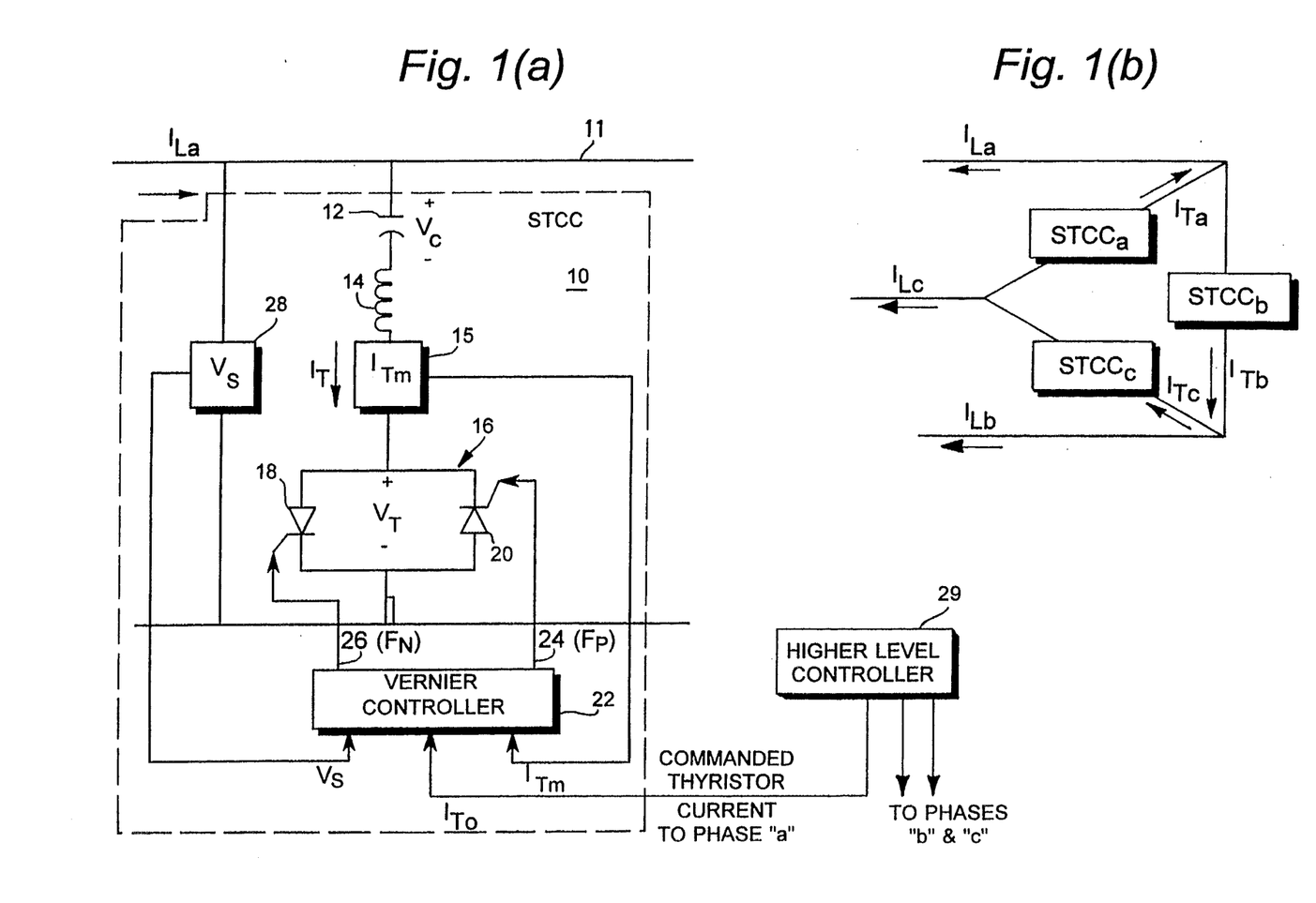
FIG. 1(a) is a function block diagram of a single phase of a shunt connected thyristor-controlled capacitor (STCC) according to the present invention.
FIG. 1(b) shows typical 3-phase delta connection with each phase having a STCC.

Referring to FIG. 1(a), an overall block diagram of the shunt-connected thyristor-controlled capacitor (STCC) system according to the present invention is shown. Voltage $V_s$ from an AC electrical power supply network (not shown) is provided over an AC transmission line 11. The thyristor-switched capacitive network 10 is connected in shunt across transmission line 11, e.g. across one phase of the AC power supply network, and includes a capacitor 12 connected at one terminal to the AC transmission line 11 and at the other terminal to a surge protection inductor 14. Capacitor 12 may be a plurality of discrete capacitors joined as a capacitor bank having a known capacitive reactance $X_C$. Surge inductor 14 is also connected to a thyristor valve 16 having antiparallel thyristors 18 and 20 which are controlled by externally generated firing signals 26 and 24, respectively.

FIG. 1(b) illustrates a typical delta-connected three phase power supply system with line and phase currents appropriately labelled. Each phase includes its own STCC for implementing the vernier control of the present invention. Those skilled in the art will appreciate that the present invention may also be applied to Y-connected three phase systems and single phase systems.

Vernier controller 22 receives as inputs the source voltage $V_s$ measured thyristor current $I_{Tm}$ and a commanded thyristor current $I_{To}$. A conventional high level controller 29 determines when changes in reactive power are necessary and generates a commanded thyristor current $I_{To}$ as an input to vernier controller 22. Based on those variables, vernier controller 22 determines a firing advance angle $\beta_F$ which is used to generate firing control signals 24 and 26. In FIG. 1(a), the following variables are shown: $I_{La}$ for line current; $V_c$ for the voltage across capacitor 12 and $I_T$ for the current flowing through inductor 14 and thyristor valve 16, and $V_T$ for the voltage across the thyristor valve. Conventional voltage and current sensors, such as voltage sensor 28 and current sensor 15, are provided as shown and connected to vernier controller 22.

When vernier controller 22 generates firing control pulses over lines 24 and 26, a variable amplitude thyristor current pulse conducts through thyristor valve 16 either through positive thyristor 18 or through negative thyristor 20 depending on the firing advance angle $\beta_F$ calculated by controller 22 and the polarity of $V_s$. In typical shunt-connected, thyristor-switched capacitors, thyristors 18 and 20 are fired either to fully block the thyristor current $I_T$, i.e. $I_T=0$, or permit full conduction thyristor current to the flow at a relatively constant amplitude. In contrast, the STCC of the present invention permits control of the amplitude of the thyristor current $I_T$ from zero to a full conduction value. This makes possible vernier changes in line current $I_{La}$ drawn from the source (i.e. the power supply network).

Vernier operation refers to making changes in the effective admittance of the STCC 10 (in addition to fully "on" or "off" admittances) to incrementally control the magnitude of current conducting through the thyristor valve between fully on or off conduction. In this way, the amount of reactive current drawn from the source is varied. In the phase-controlled thyristor firing scheme of the present invention, thyristor valve 16 is fired at a predicted upcoming time after a normal thyristor firing time to provide vernier control of the STCC 10.

Figure 2A:
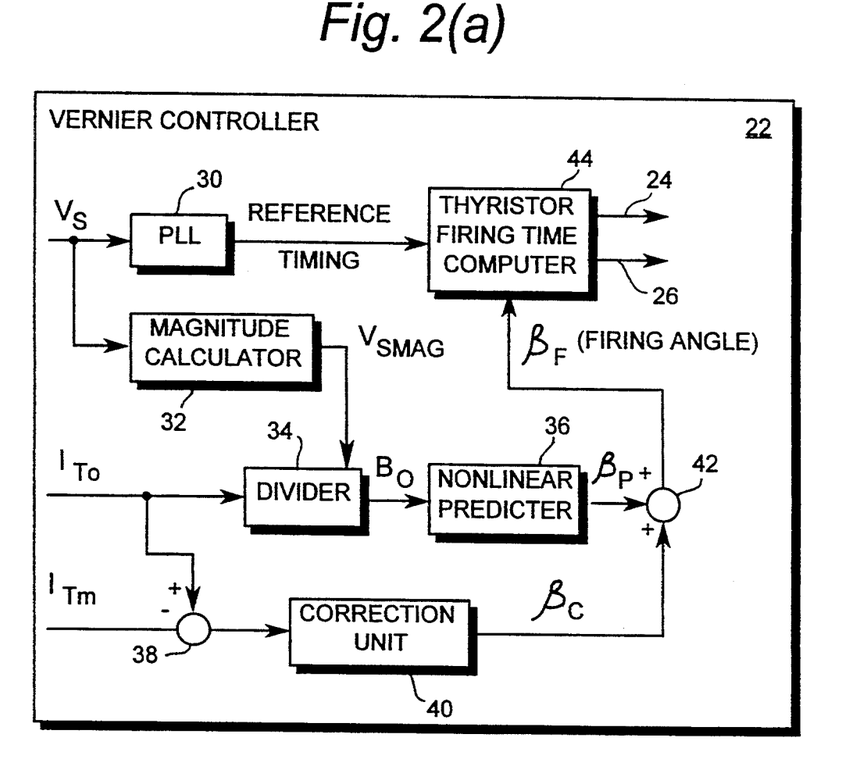
FIG. 2(a) is a more detailed function block diagram of a vernier controller used in the present invention for controlling the STCC shown in FIG. 1.
Figure 2B:
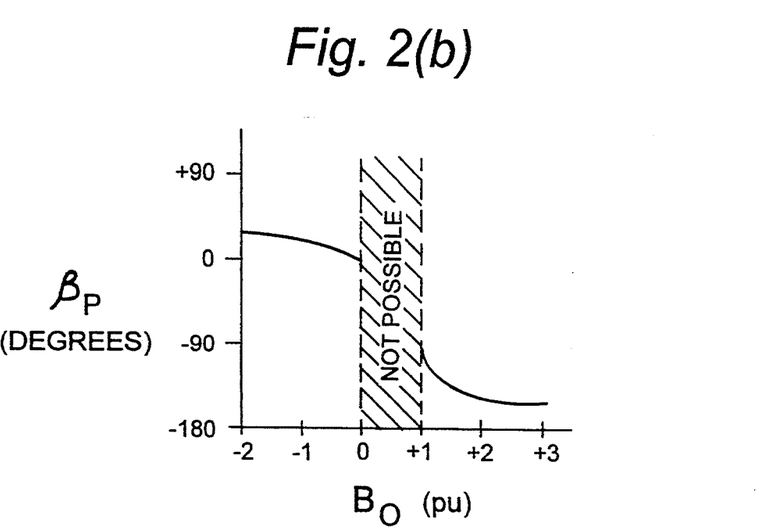
FIG. 2(b) is a graph of predicted firing advance angle ($\beta_p$) versus ordered susceptance ($B_o$)

The vernier controller 22 is described now in more detail in conjunction with FIG. 2(a). The line voltage $V_s$ detected by voltmeter 28 is input as a reference oscillator input to conventional phase-locked loop (PLL) 30 which generates a reference timing signal for a conventional thyristor firing-time computer 44. A magnitude calculator 32 also receives the measured source voltage $V_s$ (a sinusoidal signal in timer) and calculates the magnitude of that source voltage. When higher level controller 29 determines that reactive power must be changed, it generates a commanded thyristor current $I_{To}$ that will effect the desired change in reactive power. The commanded thyristor current $I_{To}$ is divided in a conventional divider 34 by the source voltage magnitude $V_s$ which produces a commanded susceptance $B_o$, (assuming of course that conductance is essentially negligible). A nonlinear predictor 36 uses the commanded susceptance $B_o$ to generate a predicted firing advance angle $\beta_p$. The relationship between a predicted firing advance angle $\beta_p$ corresponding to a particular susceptance (determined from a commanded thyristor current) is governed by the particular reactances selected for the power circuit (i.e. value of capacitor 12 and surge inductor 14), and can readily be determined empirically or by mathematical evaluation of the waveshapes. An exemplary empirically determined relationship is illustrated as a curve in FIG. 2(b). Once known, that relationship is readily implemented using, for example, a conventional table-lookup technique appropriate for a firmware (using analog and/or digital components) implementation of vernier controller 22. Thus, a particular susceptance value $B_o$ input to a nonlinear predictor lookup table is used to access and output the corresponding $\beta_p$ stored in the table.

The commanded thyristor current $I_{To}$ is also input to a difference circuit 38 which determines a feedback error based on the measured thyristor current $I_{Tm}$ obtained from current sensor 15. The difference or error is input to a correction unit 40 such as a PI (proportional-integral) or PID (proportional-integral-derivative) controller which applies an appropriate scaling factor to the error accumulated over time to obtain a correction angle $\beta_c$. This correction signal $\beta_c$ is then combined with the predicted advance firing angle $\beta_p$ in a summer 42 to generate a firing advance angle command $\beta_F$. The thyristor firing time computer 44 generates gate pulses Fp 24 and $F_N$ 26 at the appropriate times in response to the reference timing signal received from the phase locked loop 30 and the final firing angle command $\beta_F$. Upon receipt of the firing signals 24 and 26, thyristors 18 and 20 enter a conducting state from between zero and full conduction depending on the firing angle command $\beta_F$. Consequently, pulses of thyristor current $I_T$ of varying amplitude flow through capacitor 12.

Figure 3A:
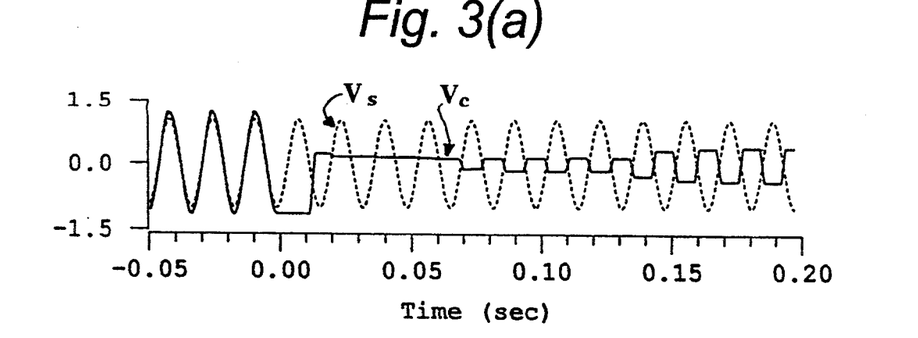
FIGS. 3(a)–(f) are graphs showing exemplary inductive vernier operation of the STCC including various voltages, currents and advance angles.
Figure 3B:
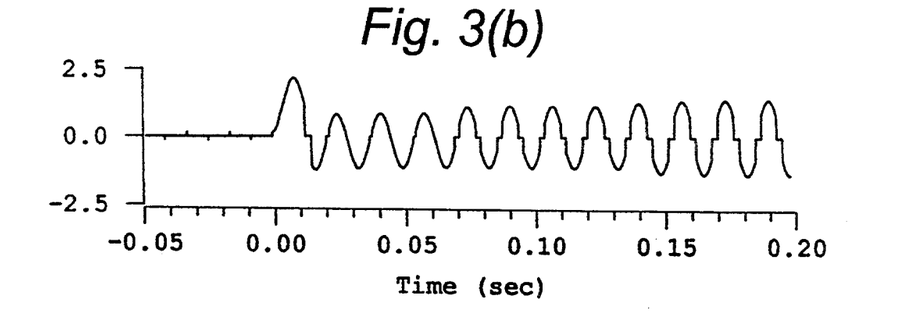
Figure 3C:
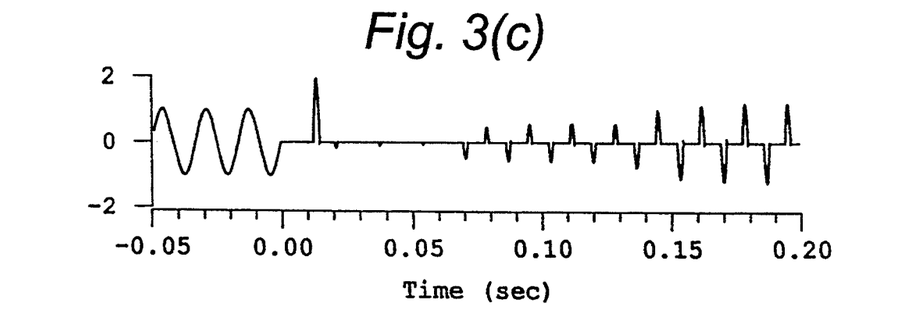
Figure 3D:
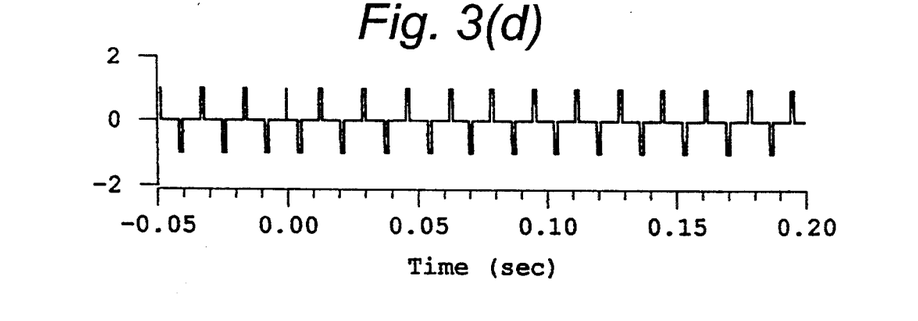
Figure 3E:
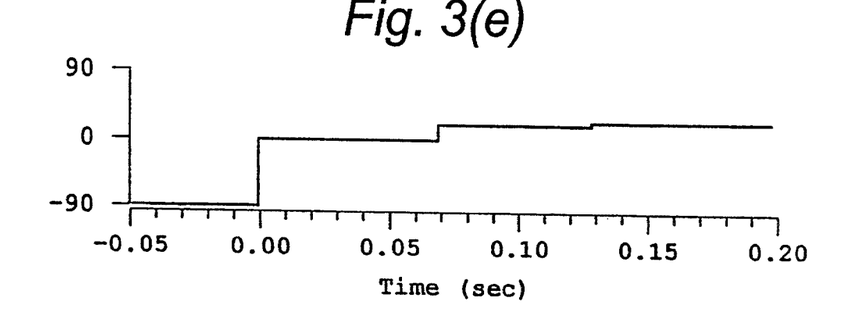

The performance of the STCC in both inductive and capacitive reactive power compensation modes will now be described in conjunction with FIGS. 3 and 4. FIGS. 3(a)–3(f) illustrate an example of inductive vernier operation of the present invention. FIG. 3(a) shows system voltage $V_S$ (a dotted line) as substantially a sinusoidal waveform with an amplitude of 1.0 pu. Up to t=0 seconds, the STCC is operating in a fully conductive capacitive mode which is typical for conventional TSCs. Capacitor voltage $V_c$ essentially tracks system voltage $V_S$ but has a slightly larger amplitude, e.g. 1.20 pu, until time t=0 seconds. In conventional capacitive operation, the thyristor current shown in FIG. 3(c) is at its full conduction value and leads the source voltage by 90 degrees. Because the thyristor is fully "on", the thyristor voltage shown in FIG. 3(b) is essentially zero. As illustrated in FIG. 3(e), full conduction corresponds to a firing advance angle of $\beta_F = -90°$.

Figure 5A:
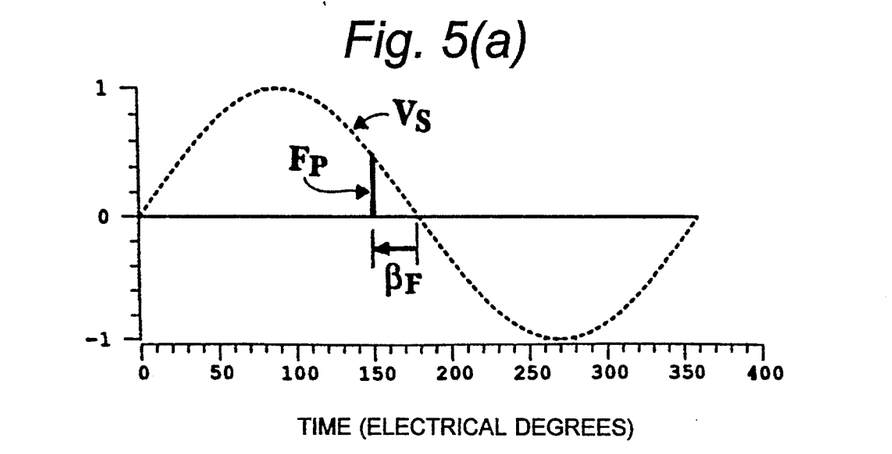
FIGS. 5(a)–(c) are graphs showing the phase relationship between various firing advance angles and source voltage.
Figure 5B:
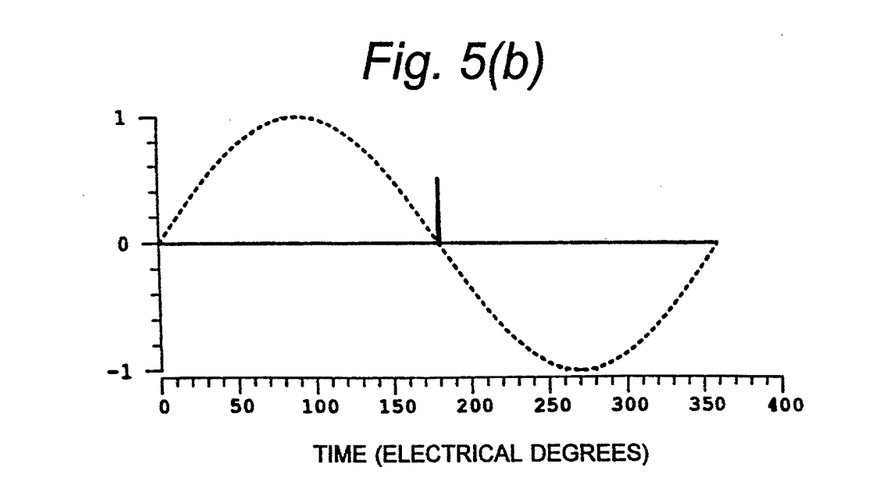
Figure 5C:
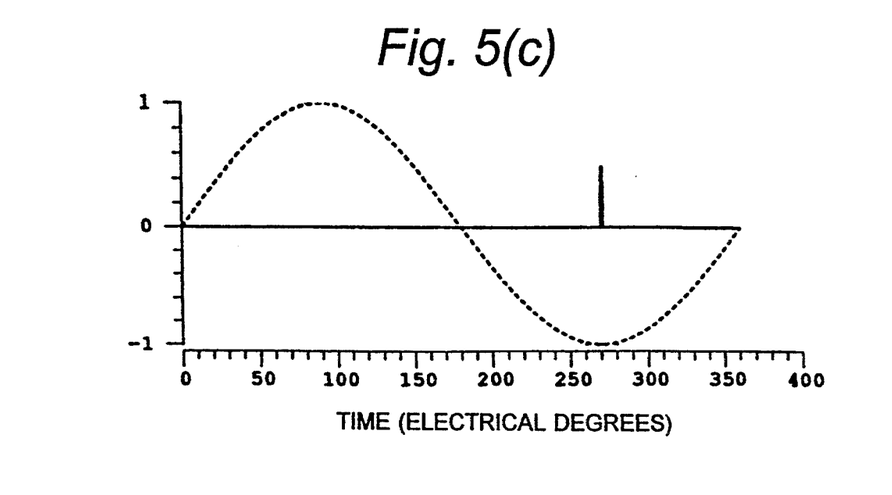

The firing advance angle is the phase angle by which the gate pulse $F_p$ for the positive thyristor 20 leads the point at which the voltage $V_S$ transitions through zero from positive to negative. FIG. 5 illustrates this definition, with 5(a) showing $\beta_f = +30°$, 5(b) showing $\beta_f = 0°$, and 5(c) showing $\beta_f = 90°$. Note that the latter two cases represent conventional control of a TSC where $\beta_f = 0°$ corresponds to the TSC off and $\beta_f = 90°$ corresponds to the TSC fully conducting.

Figure 3F:
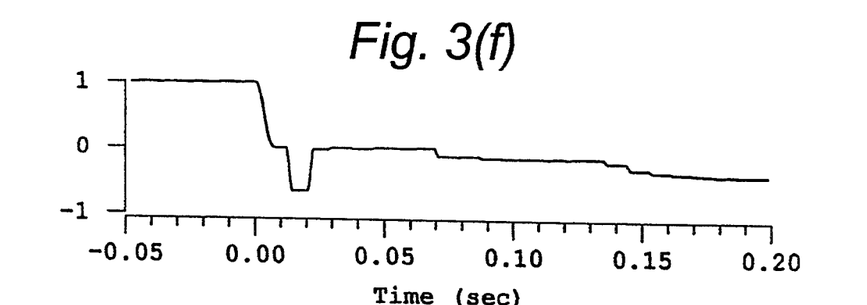

Reactive current which is shown in FIG. 3(f) is also at its steady state value, e.g. 1.0 pu, during conventional operation. Reactive current is defined as that component of current at the same frequency as source voltage $V_s$ which is 90 degrees out of phase with $V_s$. The reactive current waveform shown in 3(f) has been filtered over a full-cycle of the supply voltage and thus represents an average reactive current.

At time t=0, the firing advance angle $\beta_F$ is stepped from $-90°$ to $0°$ (see FIG. 3(e)) which blocks conduction of current through the STCC in steady state. This phase change is quite evident in the thyristor gate pulses illustrated in FIG. 3(d). The reactive current in FIG. 3(f) drops sharply from 1.0 pu to a negative value before it steadies out at about zero reflecting the newly blocked state of the thyristor. Since the capacitor 12 contains stored charge at this time, pulsing the thyristor circuit shortly after t=0 seconds tends to discharge the capacitor voltage, and in some instances, leave a small capacitive charge of opposite polarity (see FIG. 3(a)). Subsequent pulses of the thyristor circuit 16 as shown in FIG. 3(c) generally bring this offsetting capacitive voltage $V_c$ back to zero.

To achieve inductive vernier STCC control, the firing angle $\beta_F$ is advanced to selected angles of $\beta_F$ greater than $0°$. Increasing inductive operation of the STCC is achieved as $\beta_F$ increases from $0°$. As shown in FIG. 3(e), at time t=0.07 seconds, the thyristor circuit 16 is pulsed at $\beta_F = 20°$, and at time t=0.13 seconds, at $\beta_F = 25°$. Increasing $\beta_F$ from $0°$ (no conduction) results in a gradually increasing but negative average reactive current as shown in FIG. 3(f). In these plots, a positive value indicates capacitive current (i.e. leading $V_s$ by 90 degrees), while a negative value indicates inductive current (i.e. lagging $V_s$ by 90 degrees). Thus, the trend to a negative value of reactive current exhibited with increasing $\beta_F$ shows that this mode of operation is inductive in nature. This is verified by noting that the positive pulses of thyristor current $I_T$ in FIG. 3(c) occur 90° after the positive peak of system voltage $V_s$ in FIG. 3(a).

As the firing advance angle is further increased, thyristor current $I_T$ pulses of increasing amplitude are generated as shown in FIG. 3(c). When those pulses of current occur, the thyristor voltage waveform in FIG. 3(b) appropriately shows zero voltage (i.e. flat portions in the waveform). However, when the thyristor is not conducting, the amplitude of both the thryistor voltage $V_T$ and capacitor voltage $V_C$ also increases with increasing firing advance angle $\beta_F$. The fact that $\beta_F$ can be controlled in a continuous manner means that the inductive current can also be varied continuously by this means, rather than stepwise as otherwise obtained with conventional on/off control.

Operation of the STCC of the present invention illustrating capacitive vernier operation will now be described in conjunction with FIGS. 4(a)–4(f) which generally correspond to the waveforms in FIGS. 3(a)–3(f) above for inductive operation. As in the above described example, at t=$-0.05$ seconds, the STCC is in typical fully conductive capacitive operation with $\beta_F = -90°$. In the capacitive mode of vernier control, the STCC is operated even more capacitively. At time t=0, firing is delayed by an additional 25° so that $\beta_F = -115°$. This added delay in $\beta_F$ increases the phase difference between the source voltage $V_S$ and the firing of the thyristor circuit 16. This causes the reactive current shown in FIG. 4(f) to increase from its typical amplitude, e.g. 1.0 per unit (pu) in this example. As the firing advance angle $\beta_F$ is further delayed to $-130°$, the fundamental component of instantaneous reactive current increases in the capacitive direction. At a $\beta_F$ of $-130°$, the reactive component of current is approximately 120% of the full conduction level.

Figure 4A:
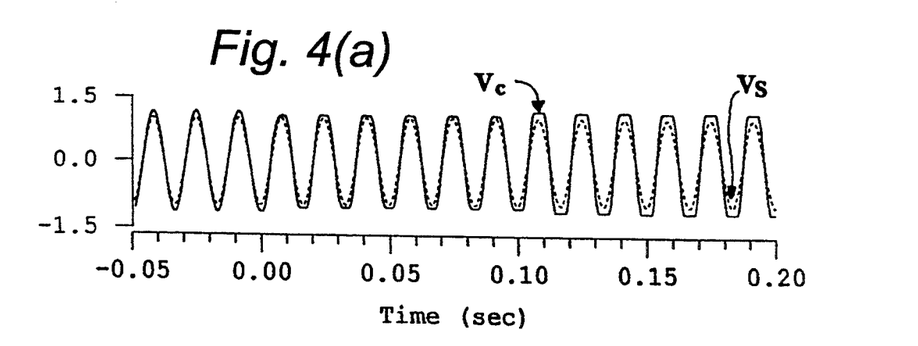
FIGS. 4(a)–(f) are graphs showing exemplary capacitive vernier operation of the STCC system of FIG. 1 including various voltages, currents and advance angles.
Figure 4B:
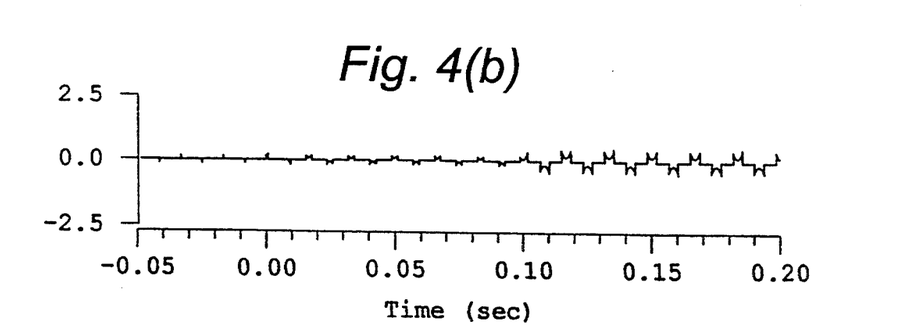
Figure 4C:
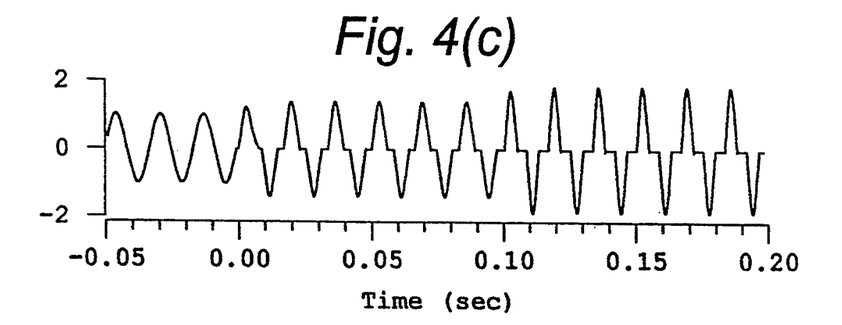
Figure 4D:
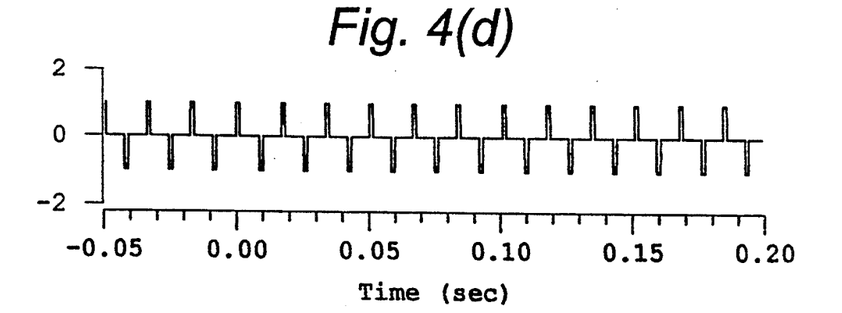
Figure 4E:
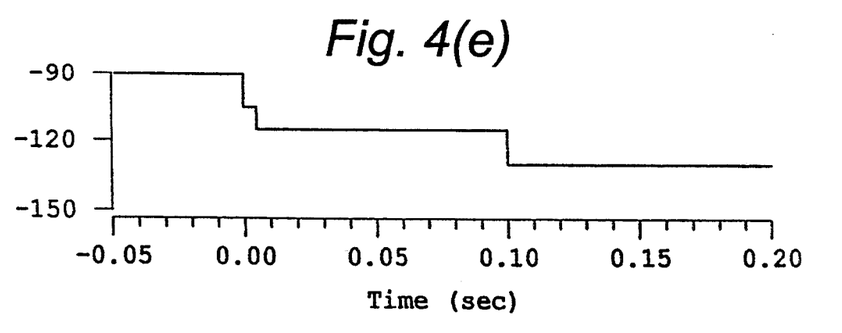
Figure 4F:
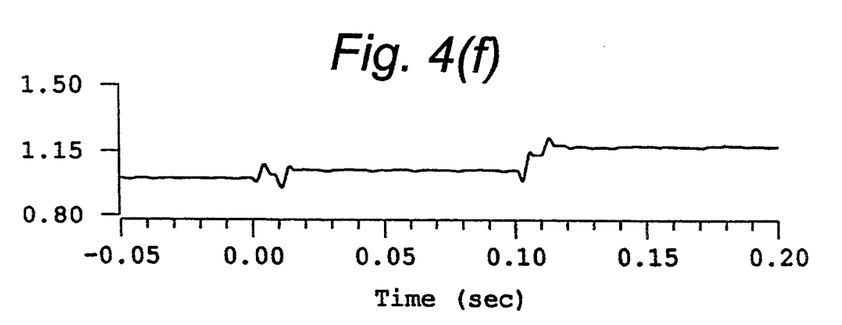

The change in firing advance angle in FIG. 4(e) from $-90$ degrees to $-115$ degrees further delays the firing pulses as seen in FIG. 4(d). The amplitude of the thyristor current peaks in FIG. 4(c) increase with further delays in firing advance angle with increasing portions of the $I_T$ waveform on either side of the peaks having zero current values. The capacitor voltage $V_c$ in FIG. 4(a) gradually increases with added firing angle phase delay with the clipped waveform peaks reflecting the periods where the thyristor current is zero. Since the thyristor voltage $V_T$ is the difference between the capacitor voltage $V_C$ and the source voltage $V_S$, the $V_T$ peaks in FIG. 4(b) likewise increase in amplitude with added firing angle delay.

Vernier control of a shunt-connected, thyristor-switched capacitor according to the present invention provides a number of advantages. First, prior art shunt-connected TSCs could only be switched fully on or fully off making reactive power control a relatively crude compensation technique. In contrast, the present invention permits fine tuned, precise reactive power control simply by generating appropriate advance firing angle commands. Second, the present invention provides required dynamic range of reactive power control with increased efficiency at reduced cost. For example, if the power system requires delivery of power with a total reactive power dynamic range $\Delta Q$ equal to 300 MVARS, conventional devices would each require a separate 100 MVAR TSC. Even under optimum circumstances this is a crude way of providing a particular amount of reactive power because reactive power can only be switched in increments of 100 MVARS. A demand for reactive power compensation of 175 MVARS could only be approximated by switching in either one or probably two of the shunt connected capacitors. On the other hand, the present invention can be constructed to achieve a dynamic range of 300 MVARS using only two 150 MVAR STCC's. A demand to deliver 175 MVARS of reactive power is readily achieved by controlling one STCC to conduct in a capacitive vernier mode and the other STCC can remain off.

Having illustrated and described the principals of the invention with respect to the preferred embodiment, it should be apparent to those skilled in the art that the invention may be modified in an arrangement with detail without departing from those principals. For example, other combinations of hardware and software may be used to implement the functions of the vernier controller. It will be understood by those skilled in the art that the invention is not limited to the disclosed embodiment and is intended to cover various modifications and equivalents included within the scope of the attendant claims.

What is claimed is:

1. A method for controlling a thyristor-switched capacitor connected in shunt across a power line in an AC power network via a thyristor valve, said method comprising the steps of:

firing the thyristor valve at a first advance angle to permit substantially full current conduction through the capacitor and firing the thyristor valve at a second advance angle to substantially completely block current through the capacitor;

calculating a third firing angle outside of the range of angles between the first and second firing angles; and firing the thyristor valve at the third firing angle to obtain partial conduction of current through the capacitor thereby providing varying degrees of reactive power to the network.

2. The method according to claim 1, wherein positively increasing the third firing angle provides increasing inductive power compensation.

3. The method according to claim 1, wherein negatively increasing the third firing angle provides increasing capacitive power compensation.

4. A method for controlling the phase at which a capacitor is connected in shunt across a power line in an AC power network via a thyristor valve, comprising the steps of:

firing the thyristor valve at a first phase angle corresponding to a first susceptance and firing the thyristor valve at a second phase angle corresponding to a second susceptance;

calculating a third phase angle outside the range of the first and second phase angles and corresponding to a third susceptance; and firing the thyristor valve at the third phase angle to conduct a thyristor current pulse whose magnitude is a function of the third susceptance.

5. The method according to claim 4, further comprising:

firing the thyristor valve at phase angles other than the first, second and third phase angles to provide varying degrees of thyristor valve conduction.

6. An apparatus for controlling the reactive power in an AC power network, comprising:

an AC power line for delivering power to a load;

a capacitor connected in shunt across the power line via a thyristor valve;

a controller for generating thyristor valve firing signals in accordance with a continuum of firing angles to adjustably control a conduction period of the thyristor valve to vary the effective reactance of the capacitor.

7. The apparatus according to claim 6, wherein the controller further comprises:

a synchronizer for generating reference timing signals based on the voltage delivered by the AC power line;

a comparator for comparing a measured thyristor parameter with a desired corresponding thyristor parameter and obtaining a difference signal;

a predictor for predicting a predicted firing angle based on the desired corresponding thyristor parameter; and a firing computer for calculating the thyristor valve firing signals based on the combination of the predicted firing angle and the difference signal.

8. The apparatus according to claim 7, wherein the predictor specifies a nonlinear relationship between the desired thyristor parameter value and a firing angle corresponding to the desired thyristor parameter value.

9. The apparatus according to claim 7, further comprising:

a corrector for modifying the difference signal.

10. The apparatus according to claim 6, wherein inductive reactive power is delivered to the AC power line when the firing angles are greater than a firing angle corresponding to no conduction through the thyristor valve and capacitive reactive power is delivered when the firing angles are less than a firing angle corresponding to full conduction through the thyristor valve.

11. A method of controlling a capacitor connected in parallel with a transmission line by a thyristor circuit, comprising:

monitoring thyristor current and line voltage;

predicting an upcoming firing time from the monitored thyristor current and line voltage; and switching the thyristor circuit to conduct thyristor current in accordance with the predicted firing time and a reference time generated based on the line voltage.

12. The method according to claim 11, further comprising:

determining the magnitude of the line voltage;

dividing a commanded thyristor current with the line voltage magnitude to obtain a commanded susceptance; and calculating a predicted firing angle based on the commanded susceptance.

13. The method according to claim 12, further comprising:

determining a difference between a measured thyristor current and the commanded thyristor current;

integrating the difference to generate a feedback correction;

summing the feedback correction and the predicted firing angle to generate the predicted firing time.

14. A reactive power control system, comprising:

a capacitor connected through a thyristor switch in shunt across a power transmission line, and a vernier controller for controlling the firing of the thyristor switch in response to a command for reactive power including:

a line voltage sensor;

a thyristor current sensor;

a timer for generating a reference time from line voltage sensed by the voltage sensor;

means for predicting an optimal firing angle for firing the thyristor switch to generate the commanded reactive power based on the sensed line voltage and a thyristor current sensed by the thyristor current sensor; and a firing time computer for switching the thyristor circuit based on the predicted firing angle synchronized with the reference time.

15. The control system according to claim 14, wherein the timer is a phase locked loop.

16. The control system according to claim 14, wherein the commanded reactive power is effected via a commanded thyristor current, the system further comprising:

a comparator for determining an error between the sensed thyristor current and the commanded thyristor current;

a correction unit for modifying the error; and a summer for summing the modified error and the predicted firing angle and sending a corrected firing angle to the firing time computer.

* * * * *